United States Patent
Kashima et al.

(10) Patent No.: US 8,320,924 B2
(45) Date of Patent: Nov. 27, 2012

(54) INTERFERENCE CONTROL IN A COMMUNICATION SYSTEM

(75) Inventors: Tsuyoshi Kashima, Kanagawa (JP); Kodo Shu, Kawasaki (JP)

(73) Assignee: Nokia Corporation, Espoo (FI)

( * ) Notice: Subject to any disclaimer, the term of this patent is extended or adjusted under 35 U.S.C. 154(b) by 1554 days.

(21) Appl. No.: 11/440,531

(22) Filed: May 25, 2006

(65) Prior Publication Data

US 2007/0275729 A1 Nov. 29, 2007

(51) Int. Cl.
*H04W 72/00* (2009.01)
*H04W 40/00* (2009.01)
*H04W 4/00* (2009.01)

(52) U.S. Cl. ........ 455/450; 455/446; 455/447; 455/453; 370/329

(58) Field of Classification Search .................. 455/446, 455/447, 450, 453; 370/329
See application file for complete search history.

(56) References Cited

U.S. PATENT DOCUMENTS

| | | | | |
|---|---|---|---|---|
| 5,038,399 A | 8/1991 | Bruckert | ........... | 455/33 |
| 5,257,398 A | 10/1993 | Schaeffer | ........... | 455/33.1 |
| 5,964,324 A | 10/1999 | Machara | ........... | 188/325 |
| 7,200,407 B1 * | 4/2007 | Smith et al. | ........... | 455/452.2 |
| 7,218,936 B2 | 5/2007 | Rinne et al. | ........... | 455/447 |
| 7,450,541 B2 * | 11/2008 | Fernandez-Corbaton et al. | ........... | 370/329 |
| 2002/0147017 A1 | 10/2002 | Li et al. | ........... | 455/447 |
| 2003/0123425 A1 * | 7/2003 | Walton et al. | ........... | 370/341 |
| 2004/0008655 A1 * | 1/2004 | Park et al. | ........... | 370/342 |
| 2004/0203812 A1 * | 10/2004 | Malladi et al. | ........... | 455/450 |
| 2006/0019701 A1 | 1/2006 | Ji | | |
| 2006/0182067 A1 | 8/2006 | Rinne et al. | | |
| 2006/0252436 A1 | 11/2006 | Tirkkonen et al. | | |
| 2009/0143070 A1 | 6/2009 | Shu et al. | ........... | 455/450 |

FOREIGN PATENT DOCUMENTS

| | | |
|---|---|---|
| EP | 1 252 731 B1 | 7/2004 |
| WO | WO 98/46033 | 10/1998 |
| WO | WO 2006/077450 | 7/2006 |

OTHER PUBLICATIONS

International Search Report for PCT Application PCT/IB2007/001336.
"Signals Ahead", Newsletter, vol. 2, No. 3, Feb. 7, 2005, Flarion Technologies—FLASH-OFDM Flexband.

* cited by examiner

*Primary Examiner* — Kamran Afshar
*Assistant Examiner* — Omoniyi Obayanju
(74) *Attorney, Agent, or Firm* — Harrington & Smith

(57) ABSTRACT

A method of allocating resources to cells of a cellular communication system comprising the steps of determining a load in at least one of the cells; selecting a resource reuse pattern from a set of resource reuse patterns based on the determined load; allocating resources in accordance with the selected resource reuse pattern.

46 Claims, 13 Drawing Sheets

Example of one conventional way of scheduling in reuse 1 system

INTERFERENCE CONTROL IN A COMMUNICATION SYSTEM

FIELD OF THE INVENTION

The present invention relates to a method, functional elements, and a system for controlling interference in a cellular communication system. In particular, but not exclusively, the present invention relates to an adaptive frequency reuse pattern, packet scheduling and admission control in a communication system.

BACKGROUND OF THE INVENTION

Mobile communication systems have been developed with the aim to facilitate communication everywhere, with everyone and at any time. In recent years, mobile communication systems, and particularly cellular communication systems, experienced a huge increase, both in the number of users and in the quality and demands of services offered.

Commonly used and widely spread mobile communication systems such as the pan-European Global System for Mobile Communication (GSM) are cellular systems. A cellular system or network is characterized in that it is organized on a cell basis, wherein each cell comprises a base station whose radio coverage area defines the geographical spreading of this cell.

Since only a limited frequency band is available for an entire mobile communication network and each communication channel requires a certain bandwidth, it is essential to exploit the available frequency band as efficient as possible such that as many users as possible can be serviced in the network. Therefore, in a cellular network, the available frequencies are usually reused on a cell basis. This means that the same set of frequencies, i.e. the same frequency band, which is used in one cell are also used in another cell of the same system in order to increase the user capacity of the system. However, in this regard, there exists a drawback in that interferences between the communications of users in different cells may occur, when the same frequencies are used. Such interferences are desired to be avoided since the communication quality is deteriorated due to them. Thus, the same frequencies are to be reused only in cells which are spaced at a minimum distance from each other. This distance is usually called spatial frequency reuse D (see FIG. 1). However, the larger distance D is and, thus, the lower potential interferences are, the fewer users can be serviced in the system, i.e. the lower the capacity of the system is. That is the spatial frequency reuse D is desired to be as small as possible, in particular in view of an increasing number of users.

In FIG. 1, a cell structure of a cellular mobile communication system is depicted according to the hexagon model, i.e. each cell is illustrated as a hexagon, irrespective of its actual physical shape. The number in each cell denotes a certain set of frequencies, i.e. a certain frequency band, which is allocated to this cell. According to FIG. 1, three frequency bands 1, 2, 3 are exemplarily used and a cell using frequency band 1 is surrounded by cells using frequency bands 2 and 3. This results in a frequency reuse factor k being 3.

Within one cell communications are effected in so-called channels. In the GSM system, for example, the channel allocation comprises a segmentation of channels both in the frequency domain and in the time domain. Thus, by dividing the available frequencies in an uplink band (for communication between a mobile station and a base station) and a downlink band (for communication between a base station and a mobile station) a frequency division duplex (FDD) technique is implemented. Further, by dividing an uplink/downlink band in a time frame structure comprising time slots, a time division duplex (TDD) technique is implemented. Other communication systems may use one of these techniques, either FDD or TDD, or a combination of these.

In order to cope with the increasing requirements mentioned above in terms of number of users and demands of services, which are posed on mobile communications, mobile systems and networks of the third generation (3G) and even the fourth generation (4G) are under development and partly already in operation, e.g. the General Packet Radio Service (GPRS) and the Universal Mobile Telecommunication System (UMTS).

The current working assumption for a future communication system of a 4G cellular system in a high frequency bandwidth requirement amounts to 1 Gbps (Gigabits per second) in maximum data rate. To achieve reasonable multi-operator scenarios in view of suchlike requirements and with limited total bandwidth availability, the frequency reuse factor in the network must be low.

A method for channel allocation utilizing power restrictions is presented in U.S. Pat. No. 6,259,685. In this method the time-slotted transmissions of synchronized base stations are arranged in such a way that transmissions utilizing maximum power P do not occur at the same time t in cells sharing the same frequency band.

The principle of a time-slotted transmission power scheme according to the cited prior art solution is illustrated in FIG. 2. The figure shows the power restrictions of the base station for a situation of three neighbouring cells, with P denoting the transmission power of the base station of the respective cell and t denoting the time. In a normal situation, the single timeslots are allocated to different terminals at different geographical locations.

Another prior art method implementing power control is known as the Flarion Flexband (FF). According to this method sub-carriers are divided into three frequency groups. These three frequency groups are reused in neighbouring cells and the transmission power of each group is predetermined such that the same frequency is used at different powers in different cells. For example, one cell will use a frequency f1 at a high power while another neighbour cell will use the same frequency f1 at a low power. Through this method, the interference is suppressed.

According to another method in the prior art PCT/IB2005/000137 a predetermined power sequence may be used that defines the transmission powers for sub carrier and each time slot in a transmission frame. The power sequences of the cells are organised in order to reduce interference.

Due to the mobility of terminals and multi-media traffic, the traffic in the wireless systems is not always uniformly distributed in every cell. In other words, the amount of traffic in some cells can be extremely high during the specific period (e.g., rush hours). In the packet-based wireless systems, the cells with high loading may experience the congestion problem, namely, packets waited for a long time period in the queues for scheduling or packets even discarded due to either the buffer overflow or the queuing time over some threshold values.

Since the prior art methods mentioned above employ predetermined power sequences, as such the systems cannot adapt to load imbalance between cells since the predetermined power sequences assume uniform traffic distribution in the network.

The prior art mentioned above also suffers from the disadvantage that the methods employ the use of complicated power sequence designs that require additional pre-configuration work in the network planning phase.

Thus, a solution to the above problems and drawbacks is desirable for a cellular communication network, in which frequency reuse possibilities are limited.

Consequently it is an object of the present invention to alleviate the above drawbacks inherent to the prior art and to provide a method of controlling interference in a communication system.

SUMMARY OF THE INVENTION

According to a first aspect of the invention there is provided a method of allocating resources to cells of a cellular communication system comprising the steps of determining a load in at least one of the cells, selecting a resource reuse pattern from a set of resource reuse patterns based on the determined load and allocating resources in accordance with the selected resource reuse pattern According to a second aspect of the invention there is provided a method of allocating resources to capacity requests in a cell of a communication system comprising the steps of allocating resources and a total energy resource in the cell, determining resources required to support the capacity requests, determining a total energy required to support the capacity requests, reducing the number of capacity requests if the resources required to support the capacity requests exceed the resources available in the cell or if the total energy required to support the capacity requests exceeds the total energy resource available in the cell and allocating resources to the capacity requests.

According to a third aspect of the invention there is provided a method for scheduling capacity requests on resources in a communication system comprising determining the total capacity requests in a plurality of cells and allocating the capacity requests to orthogonal resources and allocating any remaining capacity requests to non orthogonal resources.

According to a fourth aspect of the invention there is provided a method of allocating resources to capacity requests a cell of a cellular communication system comprising the steps of determining a load in the cell, selecting a resource reuse pattern from a set of resource reuse patterns based on the determined load, allocating resources to the cell in accordance with the selected resource reuse pattern, determining resources required to support the capacity requests in a cell, reducing the number of capacity requests if the resources required to support the capacity requests exceeds the resources allocated to the cell and allocating resources to the capacity requests.

According to a fifth aspect of the invention there is provided a method of allocating resources to capacity requests in a cell of a cellular communication system comprising the steps of assigning to the cell a resource order that defines the order in which resources are to be used, allocating resources to the cell in accordance with the assigned resource order, determining the resources required to support the capacity requests in each cell, reducing the number of capacity requests if the resources required to support the capacity requests exceeds the resources allocated to the cell and allocating the resources to the capacity requests.

According to a sixth aspect of the invention there is provided a communications system for allocating resources to capacity requests in a cell comprising a controller for selecting a resource order that defines the order in which resources are to be used by the cell and for allocating resources to the cell accordance with the selected resource order, means for determining the resources required to support the capacity requests in each cell and for reducing the number of capacity requests if the resources required to support the capacity requests exceeds the resources allocated to the cell, and a controller for allocating the resources to the capacity requests.

According to a seventh aspect of the invention there is provided a communications system for allocating resources to capacity requests in a cell comprising means for determining a load in the cell means for selecting a resource reuse pattern from a set of resource reuse patterns based on the determined load, means for allocating resources to the cell in accordance with the selected resource reuse pattern, means for determining resources required to support the capacity requests in a cell, means for reducing the number of capacity requests if the resources required to support the capacity requests exceeds the resources allocated to the cell and means for allocating resources to the capacity requests.

According to an eighth aspect of the invention there is provided a communications system for allocating resources to capacity requests in a cell comprising means for allocating resources and a total energy resource in the cell, means for determining resources required to support the capacity requests, means for determining a total energy required to support the capacity requests, means for reducing the number of capacity requests if the resources required to support the capacity requests exceed the resources available in the cell or if the total energy required to support the capacity requests exceeds the total energy resource available in the cell and means for allocating resources to the capacity requests.

According to a ninth aspect of the invention there is provided a communication system for scheduling capacity requests on resources in a plurality of cells comprising means for determining the total capacity requests in the plurality of cells, means for allocating the capacity requests to orthogonal resources and means for allocating any remaining capacity requests to non orthogonal resources.

According to a tenth aspect of the present invention there is provided a controller for scheduling capacity requests on resources in a plurality of cells wherein the controller is arranged to determine the total capacity requests in the plurality of cells, allocate the capacity requests to orthogonal resources and allocate any remaining capacity requests to non orthogonal resources.

BRIEF DESCRIPTION OF DRAWINGS

In the following the present invention will be described with reference to the accompanying drawings in which.

DETAILED DESCRIPTION OF EMBODIMENTS OF THE PRESENT INVENTION

The present invention is intended for a cellular system where frequency reuse possibilities are limited. Embodiments of the invention are described in relation to a FDD and TDD system. However, the present invention is not restricted thereto, but other types of systems such as CDMA systems can also be enhanced by applying the present invention.

Figure 1:
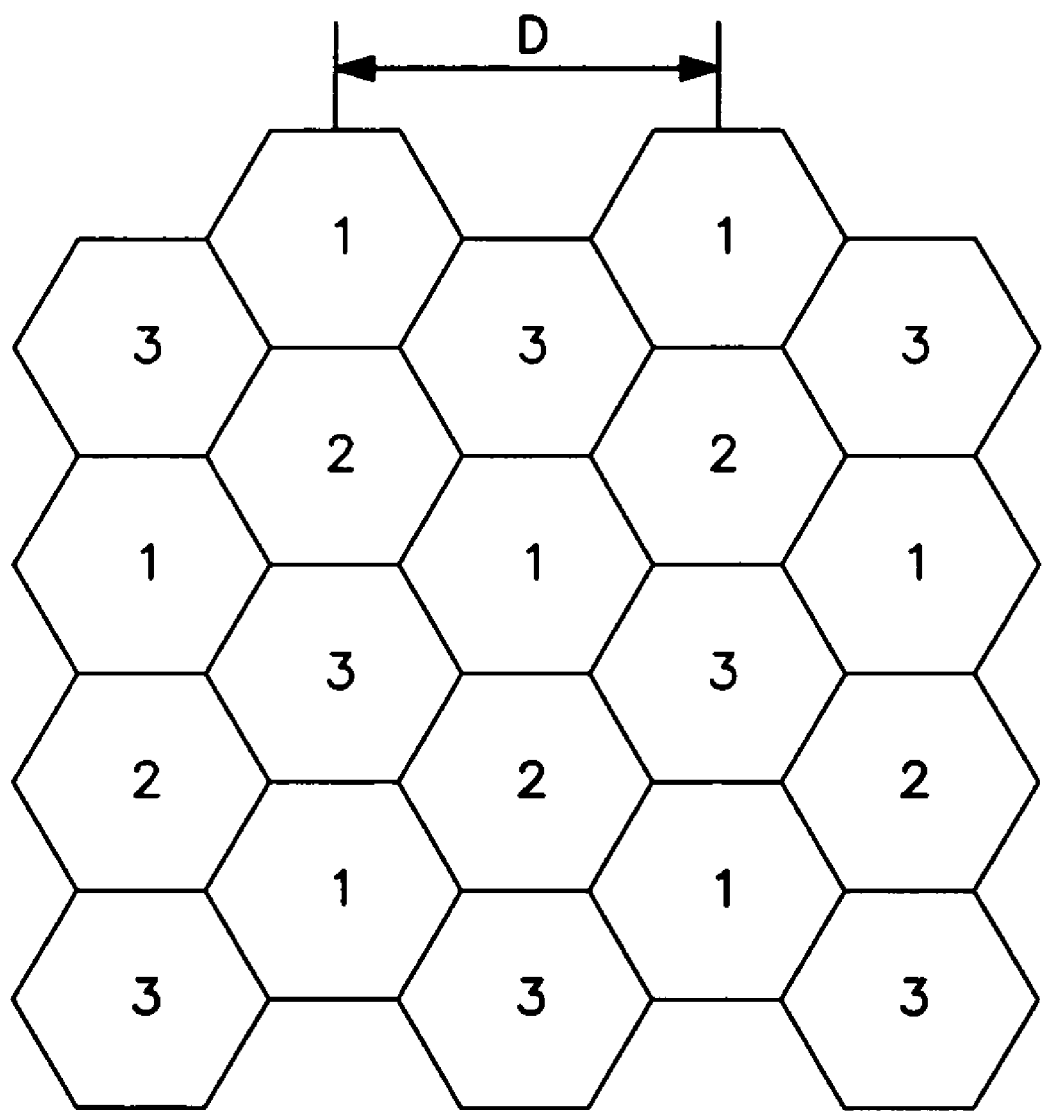
FIG. 1 shows a cell structure of a cellular mobile network according to the hexagonal model.
Figure 2:
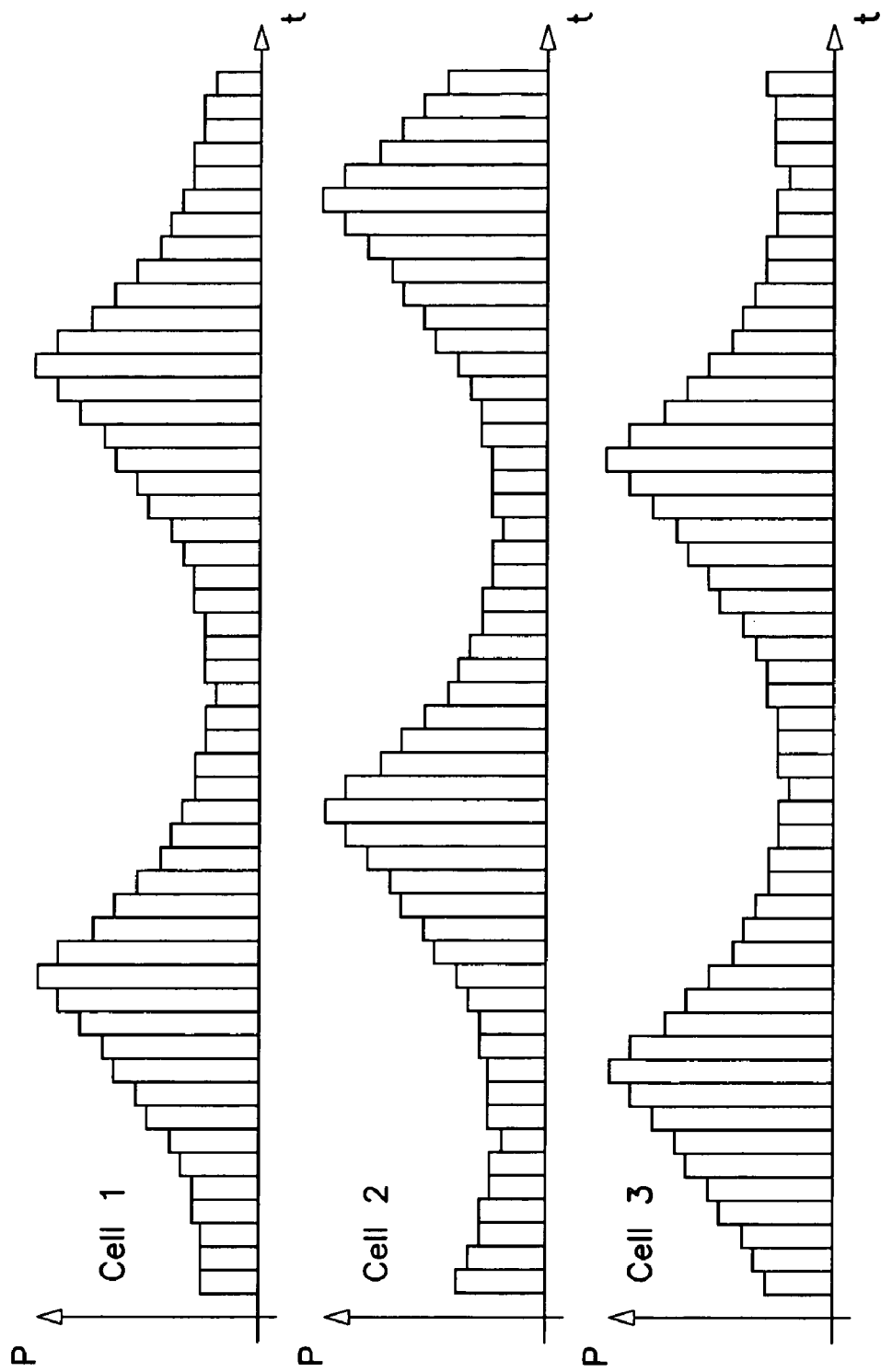
FIG. 2 shows a time slotted transmission power scheme according to the prior art.
Figure 3:
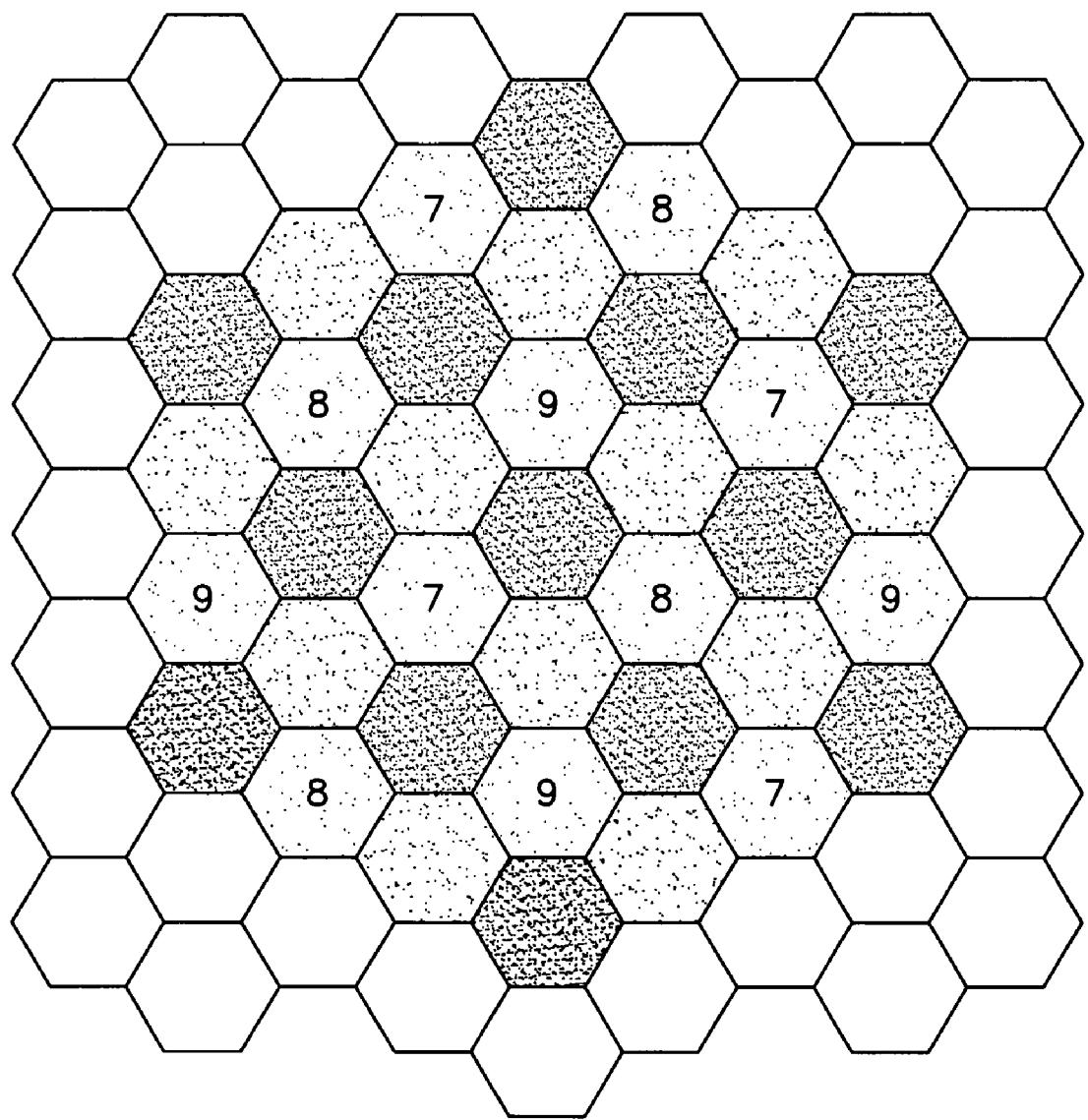
FIG. 3 which shows a cell structure of a cellular communication system showing two types of frequency reuse patterns.

FIG. 3 shows the cellular structure of a communication system. Each radio cell is typically served by a base station. A base station apparatus or site may provide more than one cell. The shape and size of the cells depend on the implementation and may be different from the illustrated shapes.

Figure 12:
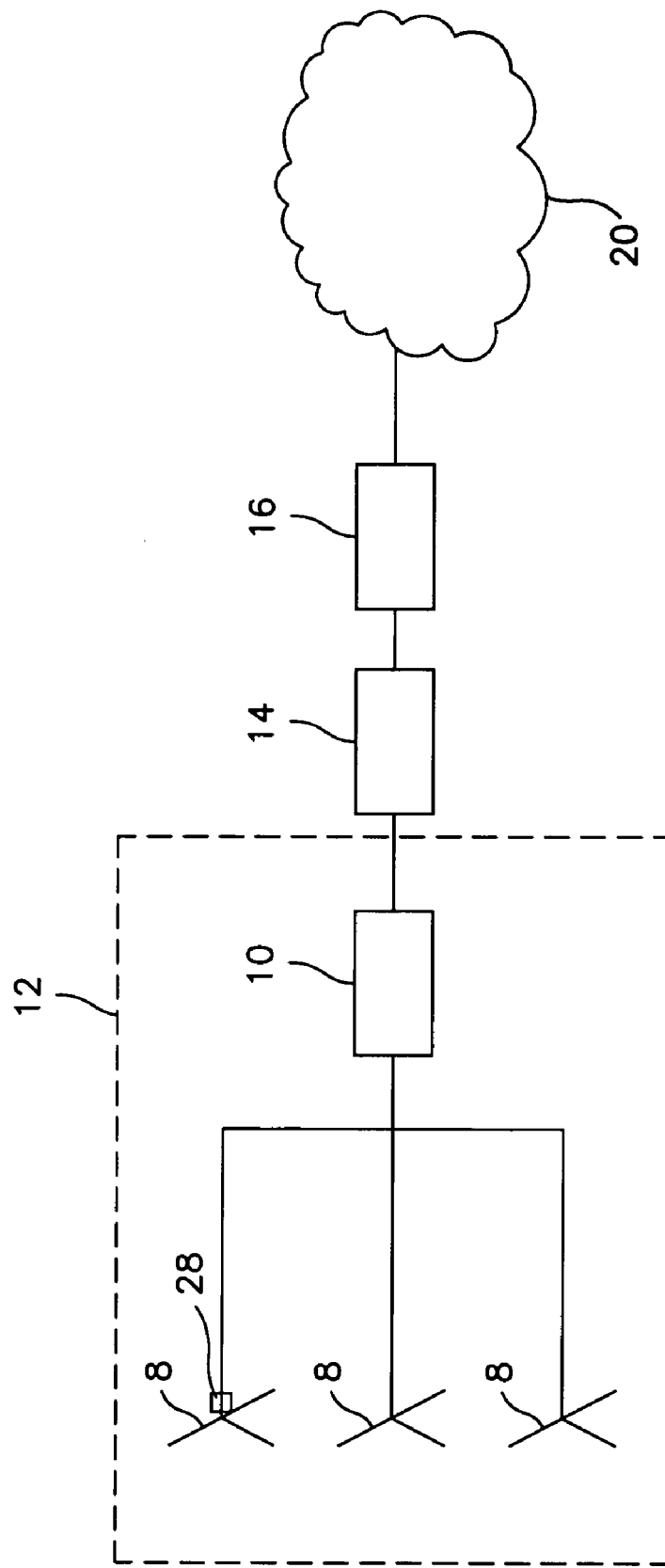
FIG. 12 depicts part of the architecture of a UMTS (universal mobile telecommunications network)

Each of the base stations is connected to an access network controller such as a radio network controller (RNC) 10 of a UMTS terrestrial radio access network (UTRAN) (shown in FIG. 12). The radio network controller may be connected to appropriate core network entities of the cellular system, such as an SGSN (serving general packet radio service support node) 14 for packet switched communication and additionally an MSC (mobile switching centre) for circuit switched communication.

FIG. 12 depicts part of the architecture of a UMTS (universal mobile telecommunications network). This shows a radio access network (RAN) 12 comprising base stations 8 and an RNC (radio network controller) 10; an SGSN (serving GPRS support node) 14 and a GGSN (gateway GPRS support node) 16. A network is depicted by reference 20.

The implementation of the RAN 12, SSGN 14 and GGSN 16 are well known in the art, and for the purposes of the discussion of embodiments of the present invention it is assumed that they operate in accordance with standard, known techniques except where stated.

It should be appreciated that the embodiments of the present invention are also intended for future communication system of a 4G cellular system. In particular, in embodiments of the present invention the RNC may be replaced with a Radio Resource Optimizer (RRO).

Resources used in each cell are for example frequency bands of sub carrier sets or time slot sets. Orthogonal resources allocated to each cell may be reused in a neighbouring cell according to a resource reuse pattern such as one of the patterns illustrated in FIG. 3.

FIG. 3 shows a cell structure of a cellular communication system. Each frequency may be used in each cell; therefore the frequency reuse factor is 1. However, according to an embodiment of the invention, the order in which orthogonal frequencies are used in each cell are repeated according to a resource reuse pattern. FIG. 3 shows two types of orthogonal resource reuse patterns. Each cell using the same orthogonal resource is identified by the same reuse pattern identification (ID). The first pattern shows an orthogonal resource reuse pattern of factor 3 where each reuse pattern ID is illustrated by either grey shading (G), cross hatching (CH) or dots (D). The second pattern shows an orthogonal resource reuse pattern of factor 9. In this case the number in each cell denotes the use of a different orthogonal frequency.

In an alternative embodiment of the present invention, the reuse pattern ID allocated to each cell may be allocated to a cell according to an adaptive reuse pattern method as will now be explained.

According to an embodiment of the invention there is provided an adaptive reuse pattern method wherein a set of reuse pattern IDs are prepared for different load conditions. The reuse patterns are adaptively chosen from the set based on the operational load. The load may be defined as the ratio of occupied to available channels.

The reuse pattern ID may be selected for a cell by a controller 28 located at the RNC 10 or the RRO. Alternatively the controller 28 may be located at the base station as shown in FIG. 12.

The controller may also be provided to schedule capacity requests (traffic) onto channels in accordance with the chosen reuse pattern. The controller may be located at the base station 8. Alternatively the controller may be located at the RNC 10, or RRO, illustrated in FIG. 12.

In one embodiment of the invention separate controllers are used to select the reuse pattern for a cell and to schedule capacity requests in the cell.

The reuse pattern may be selected by categorizing the load into a load class which corresponds to possible reuse pattern identifications (ID) within a particular reuse level as shown in table 1.

TABLE 1

| Load class | Load level [%] | Possible reused pattern ID | Reuse level |
|---|---|---|---|
| 1 | 0-11 | 1, 2, 3, 4, 5, 6, 7, 8, 9 | 1/9 |
| 2 | 11-33 | D, CH, G | 1/3 |
| ... | | | |

As an example illustrated in FIG. 3, cell 2 is pre-assigned with the reuse pattern IDs "2" and "G". Based on its cell load, the controller of cell 2 will choose either reuse-pattern ID "2" or "G". The reuse-pattern IDs "2" and "G" are associated with corresponding orthogonal resource units, in which the controller will first schedule the capacity requests. As an illustrative example, suppose that there are 9 resource units, if the cell 2 chooses the reuse pattern ID "2", it implies that a specific resource unit identified with the reuse pattern ID 2 is the orthogonal resource unit and will be first scheduled with capacity requests.

In one embodiment of the invention the reuse pattern IDs may be attached to cells during the planning phase of the network. In an alternative embodiment of the invention the number of load classes and number of reuse patterns associated with a cell can be changed by a controller in the system.

According to one embodiment of the invention additional resource units to those defined by reuse patterns, are allocated to each cell in a predefined order, referred to as a 'resource scheduling order' or 'resource order'. These resources may be used by the cell in the same scheduling period as the orthogonal resources are used, to schedule capacity requests that cannot be accommodated by orthogonal resources defined by the reuse patterns. The first resource units allocated to a cell in the resource order are the resource units defined by the reuse pattern ID, these resources are orthogonal. Accordingly, capacity requests that can be accommodated onto these resource units defined by the reuse ID are scheduled onto orthogonal resources. If the capacity requests cannot be fully accommodated on the orthogonal resource units that the reuse pattern indicates, the controller is arranged to schedule the excess traffic in other resource units in accordance with the resource scheduling order. Resources that are not defined by the reuse pattern ID are not orthogonal.

Figure 5:
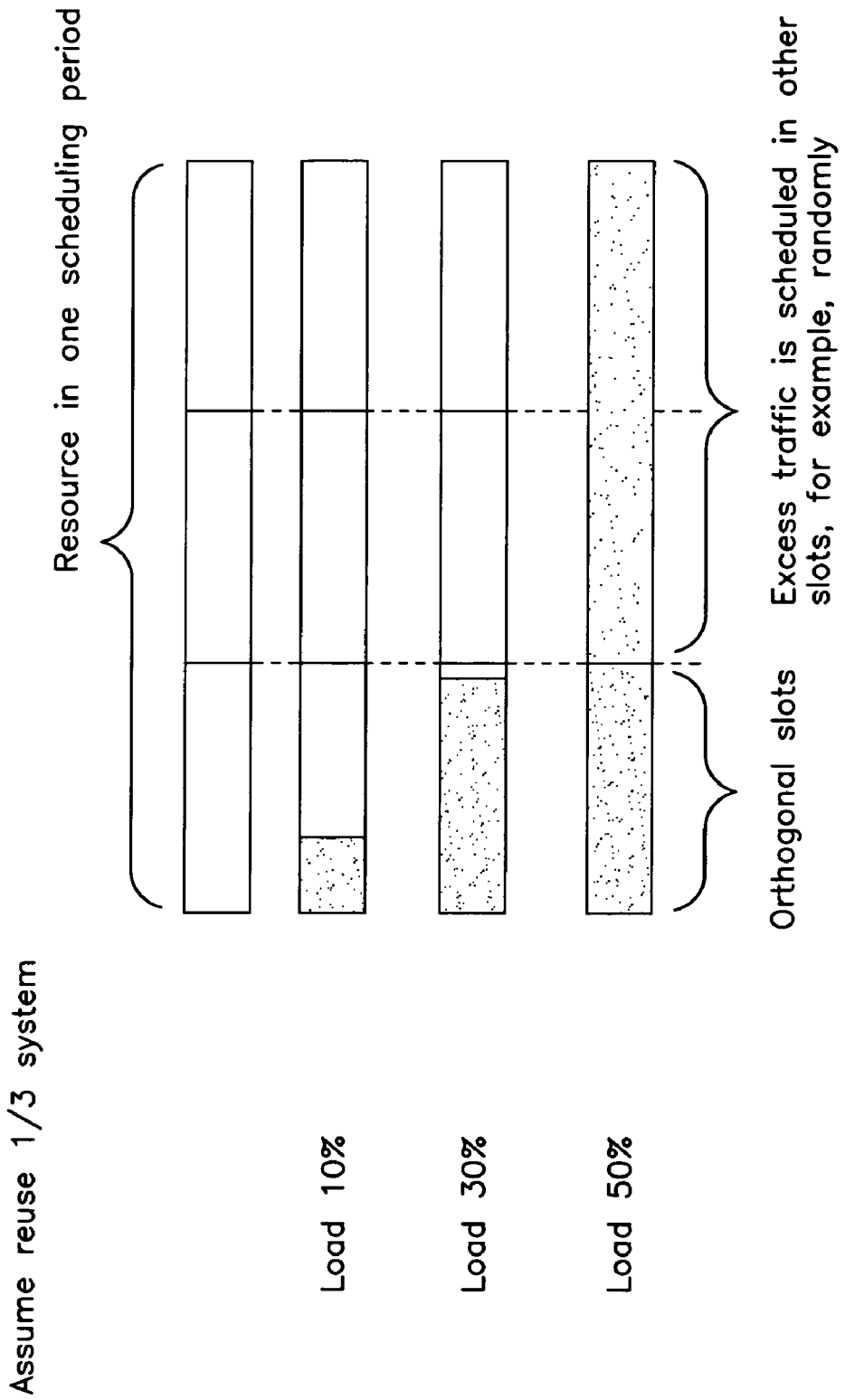
FIG. 5 is a schematic representation of the allocation of resources at different loads.

In one embodiment of the invention the excess capacity is scheduled randomly in other non-orthogonal slots. FIG. 5 is a schematic representation of the allocation of resources at different loads.

According to an embodiment of the invention the excess packets are determined and rescheduled or discarded based on a quality of service rule in the controller.

In another embodiment of the invention the excess traffic may be scheduled using other algorithms. For example the controller may arrange one cell to schedule excess traffic from the front of the system band to the back, as shown in FIG. 5, while another cell may be arranged to schedule excess traffic from the back to the front of the system band.

Figure 9:
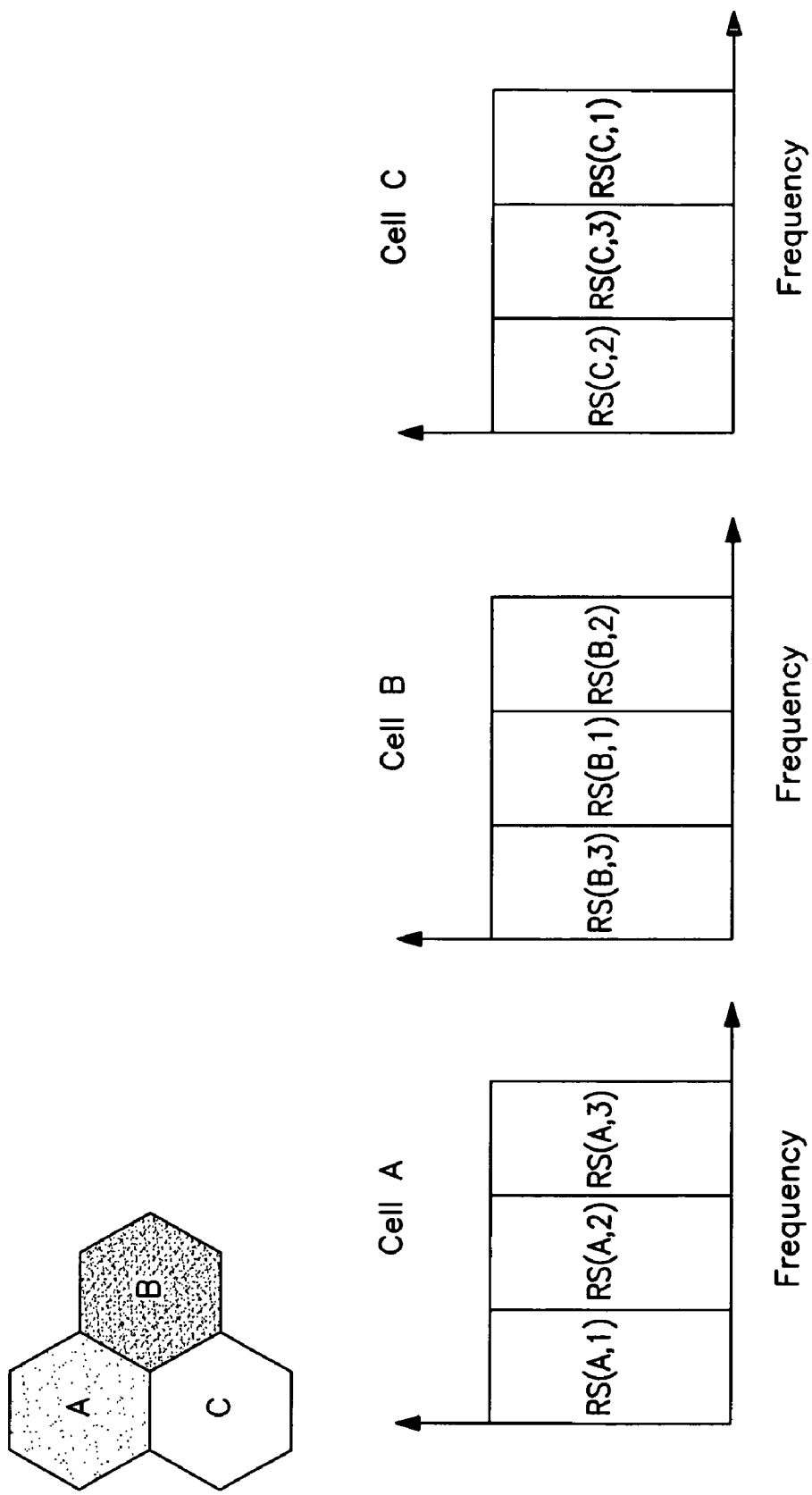
FIG. 9 shows a schematic representation of the order of the resource units, such as OFDMA sub-carriers in a frequency domain system.

In a further alternative embodiment of the invention the reuse pattern ID may also be used to specify a resource order in which orthogonal and non-orthogonal resources are to be used in one scheduling period, as shown in FIG. 9. In this case the interference caused by the use of non orthogonal resources may be reduced since it is probable that excess capacity requests will be scheduled onto a non orthogonal resource that is not being used in a neighbouring cell.

In one embodiment of the invention the resource order of resources used by the cells is cyclic. That is, the same resource order cycle is repeated in each cell however since the reuse pattern causes orthogonal resources to be used in each cell first the resource order used in each cell is out of phase with another cell. This is shown in FIG. 9.

Therefore, when employing the adaptive pattern method an orthogonal resource will be used in another cell in accordance with a reuse pattern that is dependent on the load of the system.

In one embodiment of the invention, when the system operates with a high load, that is each cell uses all the available time/frequency slots, this method may be combined with power based DCA (Dynamic Channel Assignment).

Figure 4:
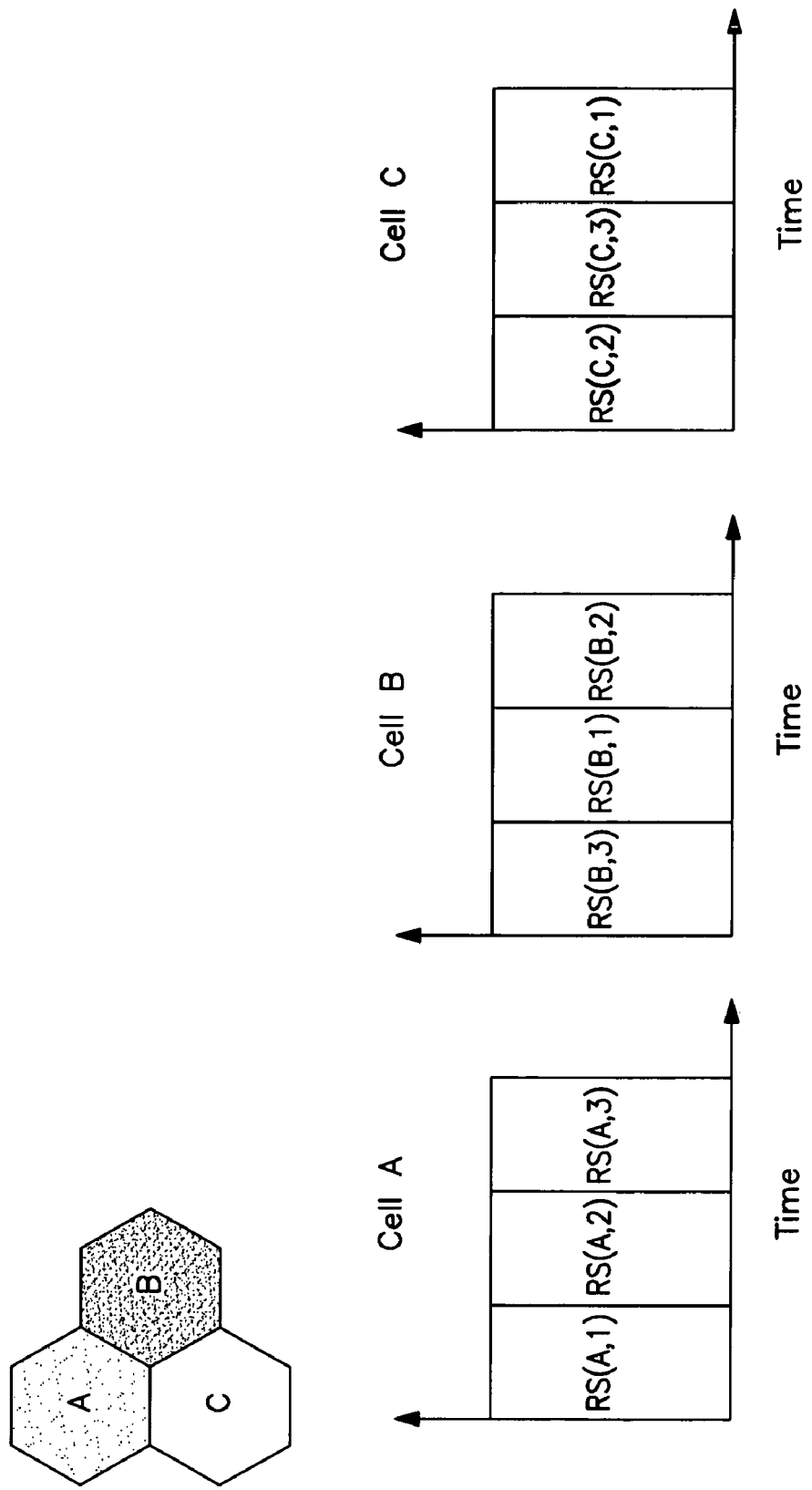
FIG. 4 is a schematic representation of a resource order in a time domain system.

The resource order used in embodiments of the invention may be applied in either the frequency domain or in the time domain. For example, in the case where the resource order is applied in the time domain, if the number of resources such as time slots available to each cell is 3, and a resource reuse pattern of factor 3 is used, in cell A the resource scheduling order may be [RS(A, 1), RS(A,2), RS(A,3)]; in cell B the resource scheduling order may be [RS(B, 3), RS(B,1), RS(B, 2)]; and in cell C the resource scheduling order may be [RS(C, 2), RS(C,3), RS(C,1)]. In accordance with an embodiment of the invention the first resources to be allocated to capacity requests in each cell during one scheduling period (RS(A, 1), RS(B,1), RS(C,1)) are defined by the reuse pattern ID and are orthogonal. This resource order is schematically represented in FIG. 4.

In a frequency domain system where more than one frequency may be used during one scheduling period, the resource order relates to the order in which traffic is scheduled on to each frequency. FIG. 9 shows a schematic representation of the order of the resource units, such as OFDMA sub-carriers in a frequency domain system.

According to a further embodiment of the invention, an admission control method is used for controlling the number of capacity requests that are accepted during each scheduling period. The admission control method according to an embodiment of the invention is described with reference to FIG. 6.

The admission control method may be carried out at the control node 28 located in the base station 8 as shown in FIG. 12. Alternatively the control node may be provided at the RNC 10 or the RRO. In a further embodiment of the invention the control node may be provided at any other suitable location in the network.

In step S1 a parameter is determined that is used to control the admission in each cell. In an embodiment of the invention this is the Power Resource (PR) which defines the total energy that a cell may use during one scheduling period. The control of the PR will be discussed hereinafter with reference to FIG. 8.

In step S2 the number (L) of capacity requests (CR) within the cell are determined.

In step S3 the required transmission power for each capacity request is determined by using a power control mechanism known in the art. For example, the power may be determined based on the requested SINR (signal to interference plus noise ratio), and/or the path loss of the capacity request.

In step S4 the resources required for handling each capacity request is determined. This may be the number of sub-carriers, or the number of time slots required for each resource request.

In step S5, it is determined if $$\sum_{k=1}^{L} RU\_k < N \quad (1)$$

where RU_k is resource unit required for the k th capacity request, where there are a total of L capacity requests and N is the number of resource units in one scheduling period.

If condition (1) is satisfied and there are enough resource units in one scheduling period for each capacity request, the method continues to step S6.

If however condition (1) is not satisfied and there are not enough resource units in one scheduling period the method continues to step S7.

In step S6 it is determined if:

$$\sum_{k=1}^{L} (TP\_k \times RU\_k) < PR \quad (2)$$

where TP_k is the transmission power for the k th capacity request calculated at step S3, RU_k is the resource unit required for each capacity request and PR is the power resource.

If condition (2) is satisfied and the total power required to transmit each capacity request in one scheduling period is less than the PR parameter the method continues to step S8.

If however condition (2) is not satisfied and the total power required to transmit each capacity request in one scheduling period is more than the PR parameter the method continues to step S7.

In step S7 it is decided which capacity requests are to be considered as excess packets that can be discarded or rescheduled to the next scheduling period. In one embodiment of the invention this is decided based on the quality of service parameter of each capacity request.

After the excess packets have been removed the number of capacity requests becomes M where M≦L.

At step S8 the capacity requests are arranged in a request order. According to an embodiment of the invention the requests may be arranged according to the transmission power of each request, in a descending order.

The first capacity request in the request order is then scheduled onto the first resource unit in accordance with the resource scheduling order. Accordingly, according to an embodiment of the invention the capacity requests with a high transmission power are scheduled onto orthogonal slots first.

As discussed previously, the resource order is the order in which resource units are allocated to each cell during one scheduling period. In one embodiment of the invention the resource order is to order the orthogonal resources to be used before non orthogonal resources are used.

Each capacity request is allocated to a resource unit in this manner such that capacity request CR(k) is scheduled to resource unit RU(k).

Figure 7:
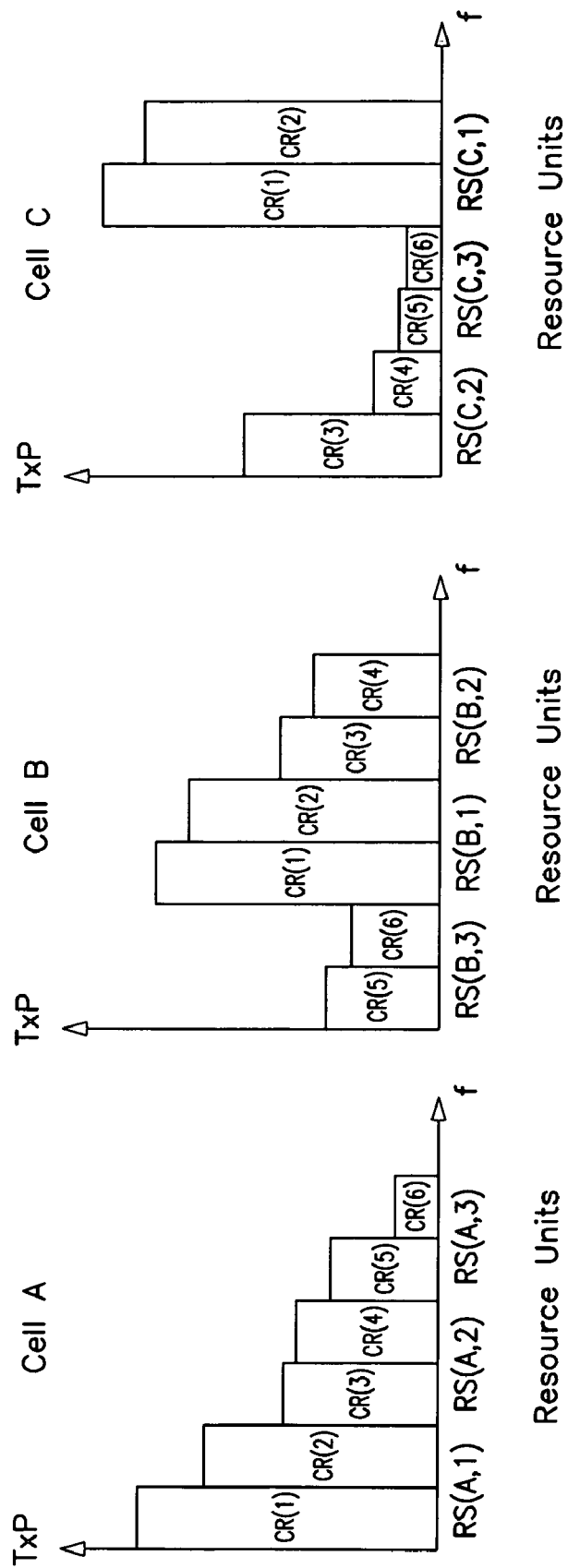
FIG. 7 shows an example of how the capacity requests may be arranged in each resource unit for each cell.

FIG. 7 shows an example of how the capacity requests may be arranged in each resource unit for each cell during one scheduling period in a frequency domain system. As can be seen in FIG. 7, the first capacity request in each cell is transmitted on the first resource unit of each cell. As described previously, in a frequency domain system, the resource order relates to the order in which capacity requests are scheduled on to each frequency. Therefore, for each cell with a different reuse pattern ID the capacity requests that are transmitted at the highest transmission powers are transmitted at different frequencies.

FIG. 4 shows an example of how the capacity requests may be arranged for each resource unit of a time domain system. As can be seen from FIG. 4, since the same resource unit is used at different times in adjacent cells according to a reuse pattern, the same resource unit is transmitted with the same or similar power in different cells but at different times.

The method of determining the PR parameter used in step S1 a parameter to control the admission in each cell will now be described in relation to FIG. 8.

Figure 8:
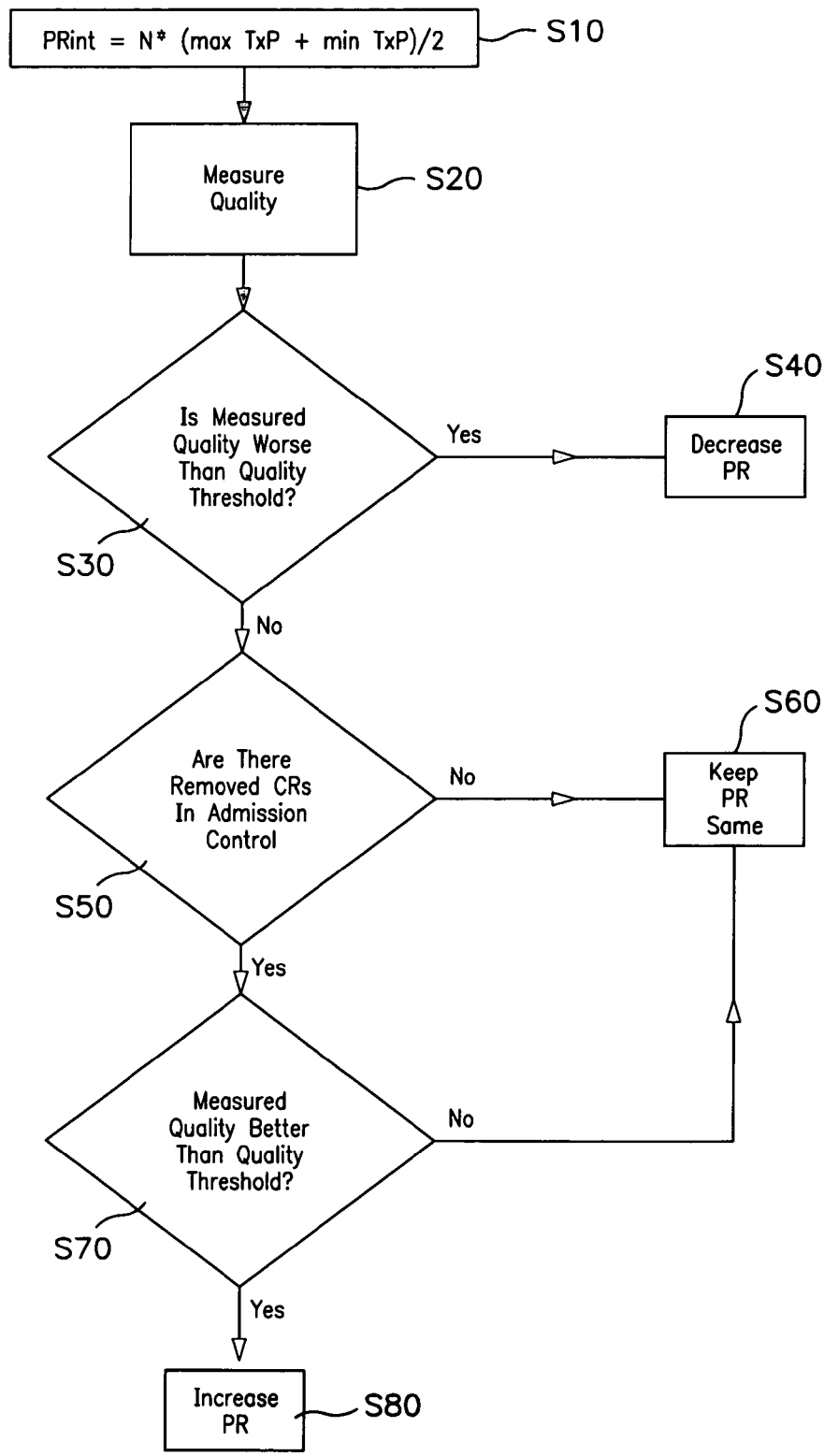
FIG. 8 shows a flow chart showing how PR is determined for each cell.

FIG. 8 shows a flow chart showing how PR may be determined for each cell according to an embodiment of the invention. For fairness between cells, the same initial value may be set to the cells having the same total transmission energy. In an embodiment of the invention the PR is adaptively changed. The initial value is therefore not particularly crucial for the system.

Assuming that maxTxP and minTxP are the maximum and minimum transmission power capability of the transceiver in the cell, and there are N resource units in one scheduling period, in step 1 PR may be initialized as:

$$PR\_init = N*(maxTxP + minTxP)/2.$$

In step S20 the quality of either or both of the uplink and the downlink communication between at least one user equipment and the base station is measured. If the quality of the links between the base station and a plurality of user equipment are measured, an average quality measurement is determined. The quality may be measured at the base station, or reported by the user equipment and may be based on a count of quality indicating metrics such as ARQ (Automatic Repeat Request) retransmission, HARQ (Hybrid ARQ) retransmission, other frame error information.

In the next scheduling period it is determined at step S30 if the measured quality is worse than a quality threshold.

If the measured quality is worse than the quality threshold the method proceeds to step 40 and the PR is decreased by a predetermined amount referred to herein as PR step.

If the measured quality is not worse than the quality threshold, the method proceeds to step S50 where it is determined if there were any CR removed in the last scheduling period in the admission control process.

If there were not any CRs removed the method continues to step S60 where the PR is set to remain the same for the next scheduling period.

If however there were CRs removed during the admission control, the method continues to step S70.

In step S70 it is determined whether the measured quality is better than the quality threshold. If the measured quality is not better than the quality threshold the method continues to step 60 where the PR is set to remain the same for the next scheduling period.

If it is determined in step S70 that the measured quality is better than the quality threshold the method moves to step S80 and the PR is increased by PR step.

This admission control and packet scheduling may be performed every radio frame or every scheduling period. This is performed independently in each cell.

In accordance with an alternative embodiment of the invention, dynamic coordinated scheduling may be employed to reduce interference when there is unbalanced loading in a set of cells.

According to a further embodiment of the invention, dynamic coordinated scheduling may be applied only when it is detected that the load of a set of cells is unbalanced.

According to a further embodiment of the invention, nodes are arranged in the network to monitor the status of cell loading for each cell. A node for monitoring the cell status may be provided for each cell and located at the base station of the cell. In one embodiment of the invention the status of cell loading may be monitored by control node 28. Alternatively a node for monitoring the cell status may be provided in the RNC 10 or RRO.

A low-loading situation may be determined by comparing the loading against a low loading-measurement threshold. In an alternative embodiment a low loading situation may be determined by means of an algorithm.

The nodes monitoring the status of cell loading may be arranged to report the status to a control node located in the network. The control node may then determine whether or not the loading is balanced or unbalanced among the cells.

Figure 6:
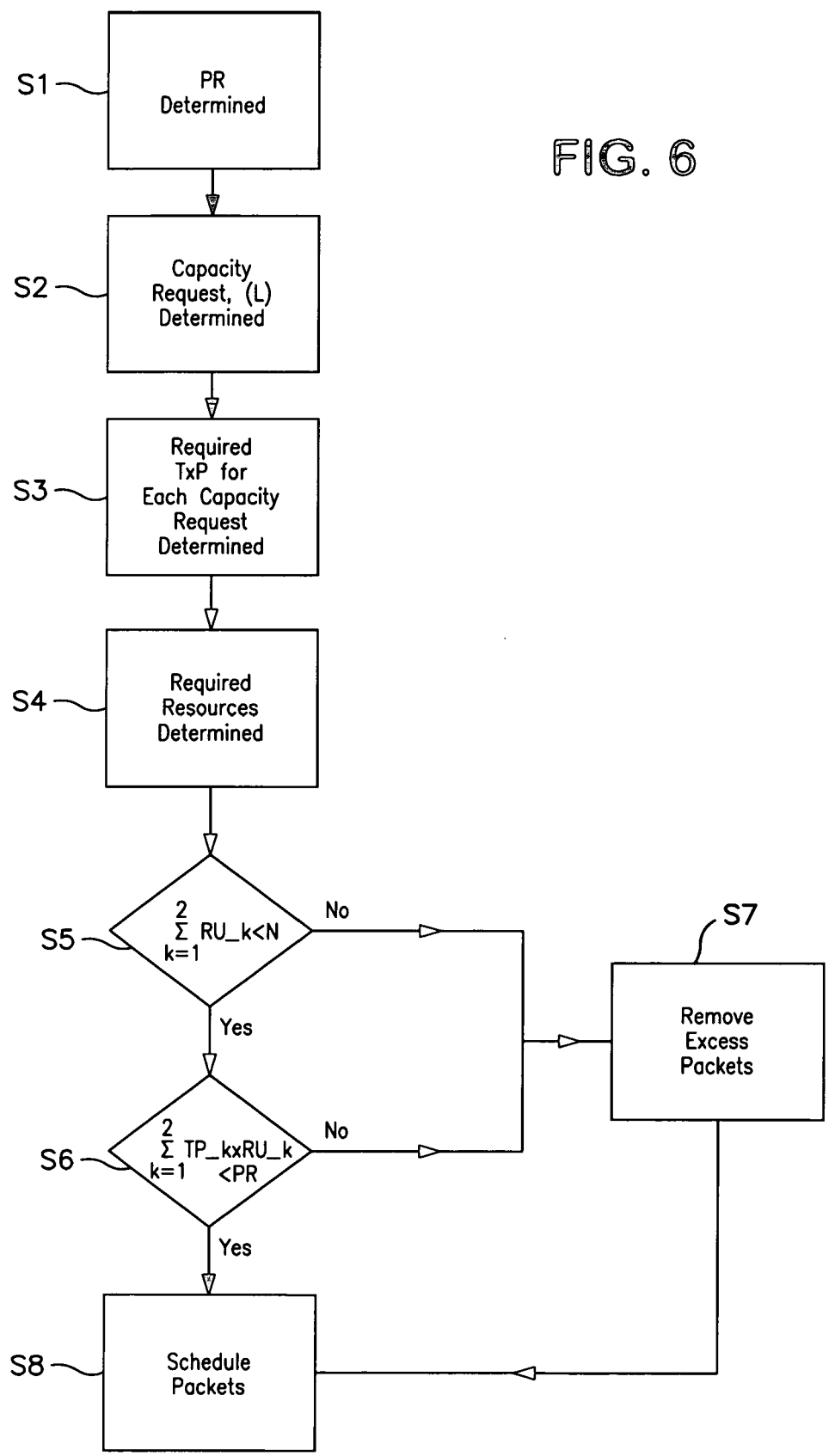
FIG. 6 is a flow chart showing an admission control method in accordance with an embodiment of the present invention.

According to one embodiment of the invention, if it is determined that the loading is balanced between the cells, the base station may be arranged to schedule capacity requests in accordance with the admission control algorithm as described in relation to FIG. 6.

If however it is determined that the loading is unbalanced, the dynamic coordinated scheduling may be applied.

Dynamic coordinated scheduling according to an embodiment of the invention will now be described.

Figure 10:
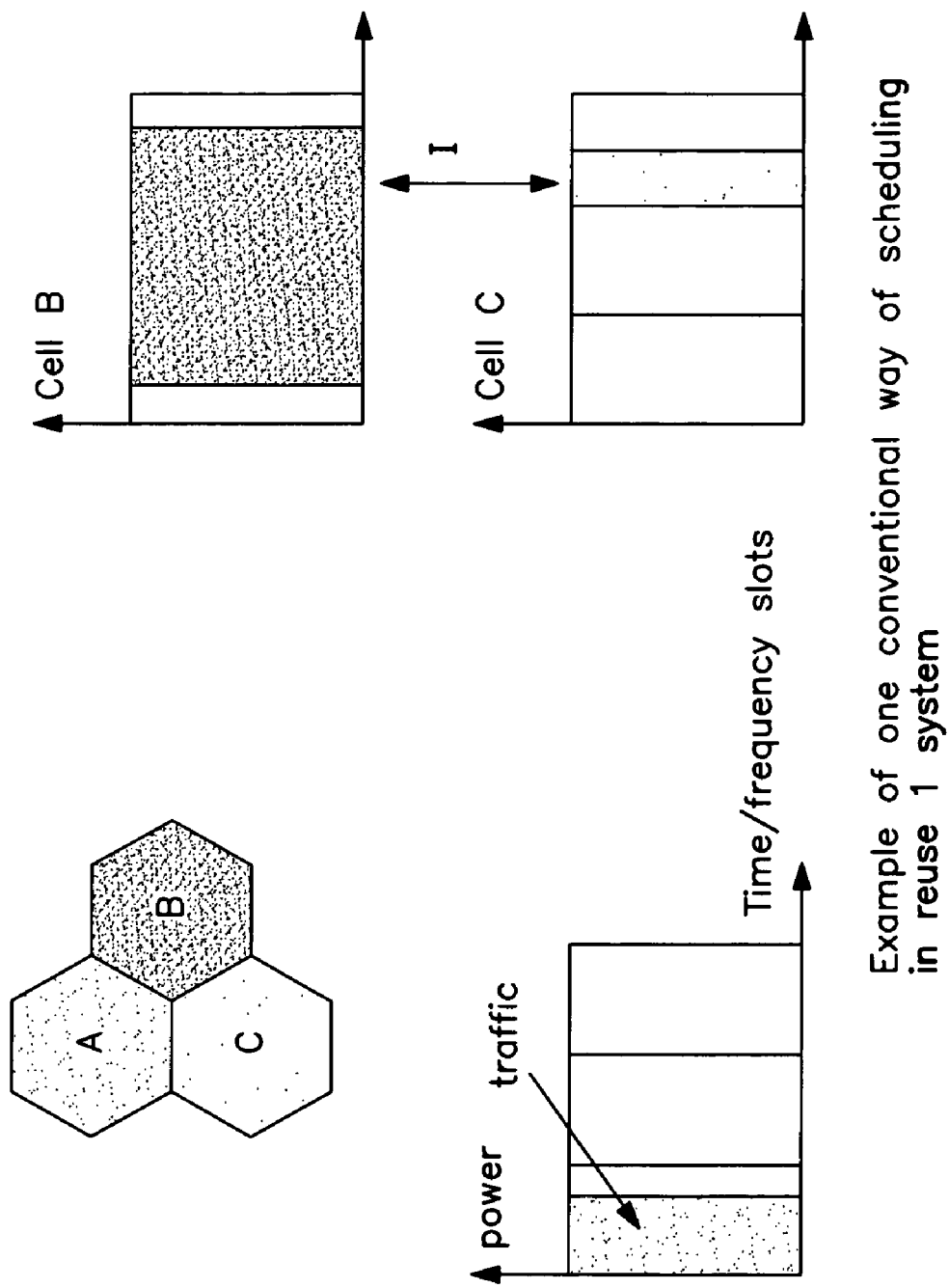
FIG. 10 shows the load for a set of cells A, B and C.

FIG. 10 shows the load for a set of cells A, B and C. The load for a cell may be defined as the ratio of used resources to available resources. FIG. 10 shows the resources as being either time or frequency slots. It should be appreciated however that in this and other embodiments of the present invention the resources may also be defined as transmission powers, beam patterns or spreading codes.

The load can be obtained as an "instantaneous" value (e.g., averaged over several frames) or a statistical value (e.g., averaged over several minutes or hours). In FIG. 10 the used resources, that is the slots that are occupied by traffic, are shown for cell A as cross hatching, for cell B as grey shading and for cell C as dots.

According to an embodiment of the present invention, for a set of cells A, B and C, the capacity requests in each cell may be allocated to resources by a controller such that the resources are 'pooled' when the traffic is scheduled.

FIG. 10 shows an example of resources used by cells A, B and C when no coordinated scheduling is applied. As can be seen, there is traffic in cell C that is allocated at the same time or frequency as a portion of the traffic in cell B. This overlap causes inter-cell interference and is indicated by letter 'I'.

As an example, cells A, B, and C have a loading of 25%, 70%, and 20%, respectively. To achieve coordinated scheduling all slots in the different cells may be considered to be virtually "combined" as a single resource for scheduling, where the total resources available may be considered as a value of 300%, whist the total amount of resources that do not overlap, i.e. are orthogonal and do not cause inter-cell interference is considered as equivalent to the total resources of one cell, that is 100%.

According to an embodiment of the present invention the total loading of the three cells may be considered as 20%+70%+25%=115%. Since 100% represents the amount of traffic that may arranged in slots that are orthogonal, in this example 15% represents the excess traffic that cannot be scheduled in slots that are orthogonal with other traffic and that is allocated to another slot in the set of cells.

Accordingly, firstly the proportion of capacity requests that may be scheduled onto orthogonal resources, represented in this example as 100% are scheduled in each cell such that these capacity requests do not occupy the same resource unit as a capacity request in another cell. According to one embodiment of the present invention the excess 15% capacity requests may then be arranged in the resource units of the cell randomly.

According to another aspect of the invention the excess traffic may be delayed by reducing the scheduling rate of delay-tolerant traffic at the cells. For example, one cell can schedule the transmissions at some slots at the rate of every N scheduling periods. N can be equal to any integer. According to this embodiment of the invention, whenever those slots do not have transmissions at this cell, the slots can be used by other cells. According to this method, delay-tolerant packets may be scheduled to slots having a low scheduling rate.

According to a further aspect of the present invention excess traffic may be scheduled in slots with a "controlled" quality of interference, that is slots which utilize a modulation system or coding system that is more suitable for interference rejection combining techniques at the physical layer.

According to one embodiment of the present invention the scheduling may be implemented in a distributed way. In such a method, the controller may perform the coordinated scheduling at the site where several base stations are co-sited. In this case, the set of cells that share scheduling information will be the cells that are served by the set of co-sited base stations.

According to a further embodiment of the present invention the scheduling may be implemented in a centralized way. The scheduling function may be implemented by a controller located at the RNC 10 or RRO. After performing the coordinated scheduling, the controller located at the RNC or RRO will then inform the detailed decisions to each cell.

Figure 11:
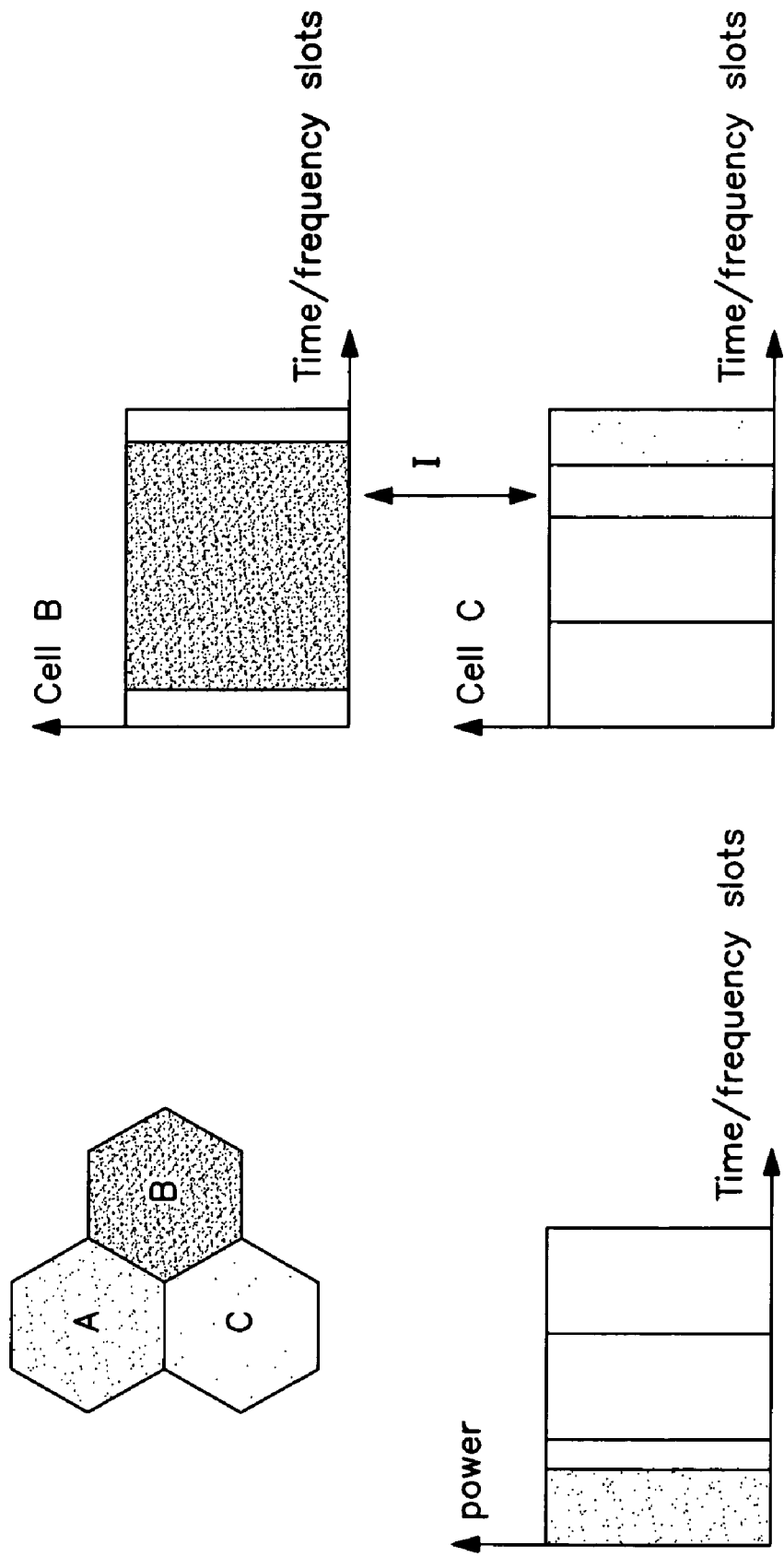
FIG. 11 shows an example of when dynamic coordinated scheduling is applied to the situation in FIG. 10.

FIG. 11 shows an example of when dynamic coordinated scheduling is applied to the situation in FIG. 10. As can be seen the overlap of slots between cell B and cell C is reduced.

According to a further embodiment of the present invention may also be applied to high load situations.

In an embodiment of the invention the traffic characteristics are used to decide which traffic should be scheduled into orthogonal slots.

Traffic characteristics include for example packet inter-arrival time, burst size or Quality of Service (QoS) priority. This list is not exhaustive. In one embodiment of the invention the characteristics can be measured. In an alternative embodiment of the invention the characteristic may either be predicted or known beforehand.

The traffic to be scheduled on to orthogonal slots can be identified by a high QoS priority. Traffic with low priority can be scheduled on to non-orthogonal slots.

In a further embodiment of the invention the power at which the traffic is transmitted is determined by a method as described in PCT/IB2005/000137. This ensures the presence of orthogonal slots for high QoS traffic.

Figure 13:
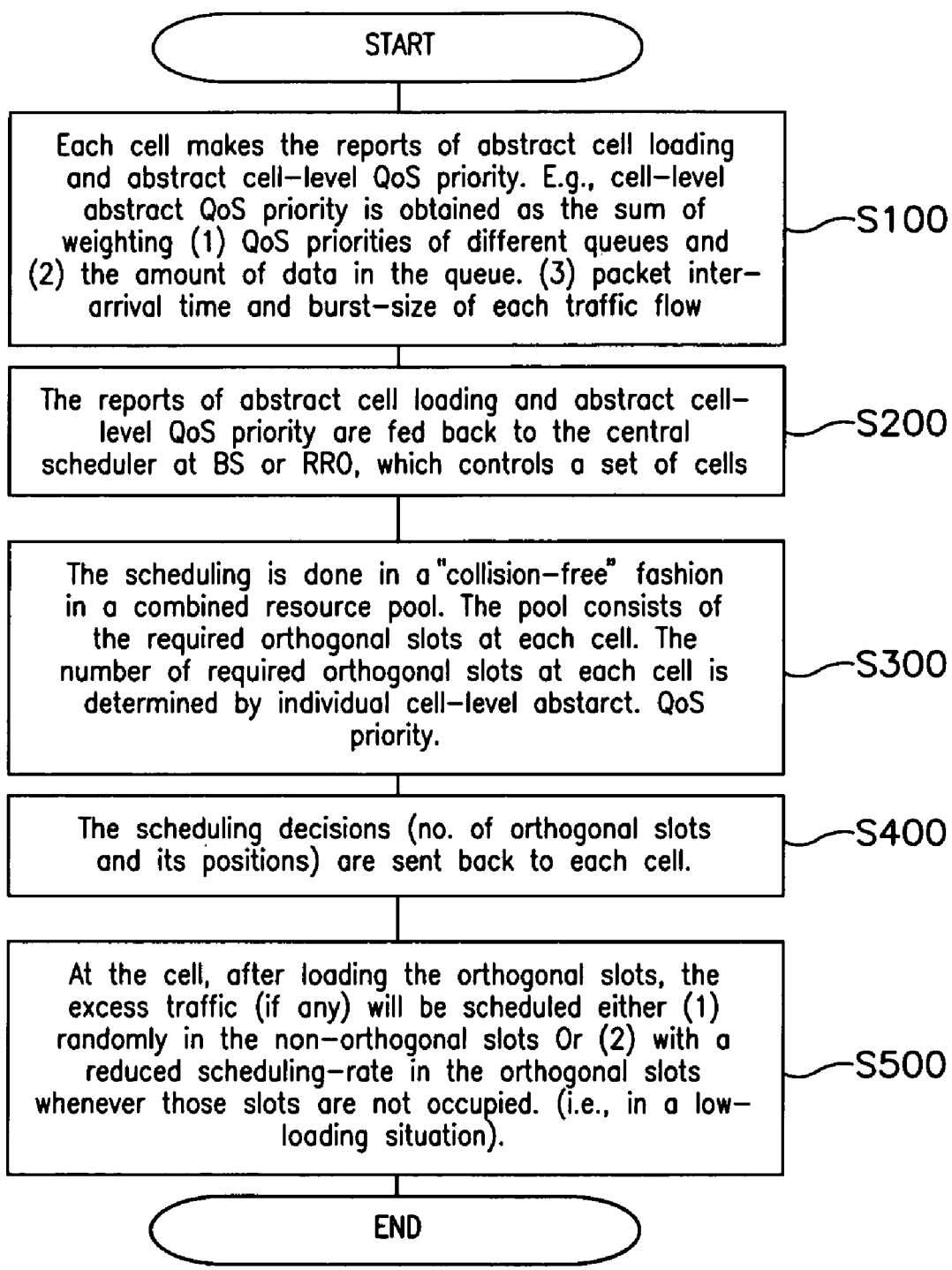
FIG. 13 is a flow chart showing a dynamic scheduling method in accordance with an embodiment of the present invention.

Reference is now made to FIG. 13 which shows the method steps according to an embodiment of the invention when dynamic scheduling is applied.

At step S100 each cell measures the cell loading and an abstract cell level QoS priority. Capacity requests are queued according to the QoS. The abstract cell level priority is obtained as the sum of weighting the: QoS priorities of different queues; the amount of data in the queue and packet inter arrival time and burst size on a particular resource unit.

At step S200 each cell reports the cell loading and the abstract cell level QoS priority to a controller located at either the base station, the RNC or the RRO.

At step S300 the controller makes scheduling decisions for each cell. Scheduling is achieved by allocating resources according to a 'collision free' method using a combined resource pool as described previously. The resource pool consists of the required orthogonal resource units at each cell. The number of orthogonal slots required at each cell is determined by individual cell level abstract QoS priority. Accordingly the controller allocates a number of orthogonal resource units to each cell.

At step 400 the controller reports the number of orthogonal resource units and their positions to each cell.

Finally at step 500 the cell loads the capacity requests to the allocated orthogonal resource units. Any remaining capacity requests may then be scheduled randomly onto non orthogonal resource units. In an alternative embodiment of the invention the remaining capacity requests may be scheduled with a reduced scheduling rate onto orthogonal resource units whenever those resource units are not occupied.

The required data processing functions in the above described embodiments of the present invention may be provided by means of one or more data processor entities. All required processing may be provided in a controller such as the controller 28 as illustrated in FIG. 12, or control functions may be separated. Appropriately adapted computer program code product may be used for implementing the embodiments, when loaded to a computer, for example for computations required when monitoring load of a cell and analysis thereof. The program code product for providing the operation may be stored on and provided by means of a carrier medium such as a carrier disc, card or tape. Implementation may be provided with appropriate software in the control node.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method comprising:
   determining a load based on a ratio of occupied to available resources in at least one of a plurality of cells;
   selecting a resource reuse pattern from a set of resource reuse patterns comprising at least a first resource reuse pattern and a second resource reuse pattern based on the determined load, wherein each pattern corresponds to a load class and defines an order in which resources are to be used and the first resource reuse pattern has a higher capacity for a communication system than the second resource reuse pattern; and allocating resources in accordance with the selected resource reuse pattern, wherein capacity requests are scheduled on the resources and the resource pattern allocated to a cell changes from the second resource pattern to the first resource pattern when the load exceeds a threshold.

2. A method as claimed in claim 1 wherein the selected resource reuse pattern defines resources to be used by each cell.

3. A method as claimed in claim 1 wherein the resource reuse pattern defines orthogonal resources.

4. A method as claimed in claim 3 wherein if the number of capacity requests exceeds the number of available orthogonal resources, the remaining capacity requests are scheduled onto non-orthogonal resources.

5. A method as claimed in claim 4 wherein the order that the capacity requests are scheduled onto resources is defined by a resource order.

6. A method as claimed in claim 5 wherein the order that the remaining capacity requests are scheduled onto non orthogonal resources is random.

7. A method as claimed in claim 5 wherein the resource order is cyclic.

8. A method as claimed in claim 4 wherein the capacity requests scheduled onto orthogonal resources are requests with high priority.

9. A method as claimed in claim 4 wherein the capacity requests scheduled on to non-orthogonal resources are requests with low priority.

10. A method as claimed in claim 5 wherein the first resource in the resource order used in each cell is determined by the resource reuse pattern.

11. A method as claimed in claim 5 wherein the resource order is determined by the reuse pattern.

12. A method as claimed in claim 4 wherein the remaining capacity requests are scheduled onto non-orthogonal resources in the order defined by the resource order.

13. A method as claimed in claim 5 wherein the resource order to allocate non-orthogonal resources is cyclic.

14. A method as claimed in claim 1 wherein if capacity requests exceed the available resources during one scheduling period the remaining capacity requests are scheduled in a further scheduling period.

15. A method comprising:
allocating resources and a total energy resource in a cell;
determining resources required to support capacity requests;
determining a total energy required to support the capacity requests;
reducing the number of capacity requests if the resources required to support the capacity requests exceed the resources available in the cell or if the total energy required to support the capacity requests exceeds the total energy resource available in the cell; and allocating resources to the capacity requests wherein the capacity requests are allocated to resources in an order that is determined based on the energy required to transmit the capacity request, wherein the resources are allocated to the capacity requests in the order of descending power required to transmit each capacity request.

16. A method as claimed in claim 15 wherein the total energy resource available in the cell is determined according to an algorithm.

17. A method as claimed in claim 15 wherein the resources are further allocated to capacity requests in accordance with a resource order.

18. A method as claimed in claim 17 wherein the resource order is repeated in another cell of a communication system in accordance with a resource reuse pattern.

19. A method as claimed in claim 15 wherein orthogonal resources available are defined by a resource reuse pattern.

20. A method as claimed in claim 19 wherein remaining capacity requests that are not allocated to the available resources defined by the resource reuse pattern are allocated to non orthogonal resources.

21. A method comprising:
determining a total capacity requests in a plurality of cells;
allocating the capacity requests to orthogonal resources identified by pooling the resources in the plurality of cells, by scheduling each capacity request onto a different resource unit of the pooled resources; and
allocating any remaining capacity requests to non orthogonal resources.

22. A method as claimed in claim 21 wherein orthogonal resources are allocated to the plurality of cells in accordance with the resource reuse pattern.

23. A method as claimed in claim 21 wherein the remaining capacity requests are randomly allocated to non orthogonal resources.

24. A method as claimed in claim 21 wherein the remaining capacity requests are allocated to non orthogonal resources in accordance with a resource order.

25. A method as claimed in claim 21 wherein the remaining capacity requests are scheduled in a further scheduling period.

26. A method comprising:
determining a load in a cell;
selecting a resource reuse pattern from a set of resource reuse patterns comprising at least a first resource reuse pattern and a second resource reuse pattern based on the determined load;
allocating resources to the cell in accordance with the selected resource reuse pattern, wherein the first resource reuse pattern has a higher capacity for a communication system than the second resource reuse pattern and the resource pattern allocated to a cell changes from the second resource pattern to the first resource pattern when the load exceeds a threshold;
determining resources required to support the capacity requests in a cell; and
reducing the number of capacity requests if the resources required to support the capacity requests exceeds the resources allocated to the cell allocating resources to the capacity requests.

27. A method comprising:
assigning a resource order that defines the order in which resources are to be used, to a cell;
allocating resources to the cell accordance with the assigned resource order wherein a first resource order has a higher capacity for a communication system than a second resource order and the assigned resource order changes from the second resource order to the first resource order when a load of the cell exceeds a threshold;
determining the resources required to support the capacity requests in each cell; and reducing the number of capacity requests if the resources required to support the capacity requests exceeds the resources allocated to the cell allocating the resources to the capacity requests.

28. A method as claimed in claim 27 wherein the resource order assigned to a cell is dependent on the load of the cell.

29. A method as claimed in claim 27, further comprising determining the total energy required to support the capacity requests;
wherein the number of capacity requests is reduced if the total energy required to support the capacity requests exceeds the total energy resource available.

30. An apparatus, comprising at least one processor; and at least one memory including computer program code, the at least one memory and the computer program code configured to, with the at least one processor, cause the apparatus to perform at least the following:
to select a resource order that defines the order in which resources are to be used by a cell;
to allocate resources to the cell accordance with the selected resource order wherein a first resource order has a higher capacity for a communication system than a second resource order and the selected resource order changes from the second resource order to the first resource order when a load of the cell exceeds a threshold;
to determine the resources required to support the capacity requests in each cell and for reducing the number of capacity requests if the resources required to support the capacity requests exceeds the resources allocated to the cell; and
to allocate the resources to the capacity requests.

31. An apparatus as claimed in claim 30 wherein the at least one memory and the computer program code are further configured to cause the apparatus to select a resource order is a Radio Network Controller.

32. An apparatus as claimed in claim 30 wherein the at least one memory and the computer program code are further configured to cause the apparatus to select a resource order is a Radio Resource Optimizer.

33. An apparatus as claimed in claim 30 wherein the at least one memory and the computer program code are further configured to cause the apparatus to allocate the resources to the capacity requests is a packet scheduler.

34. An apparatus, comprising:
means for determining a load in a cell;
means for selecting a resource reuse pattern from a set of resource reuse patterns comprising at least a first resource reuse pattern and a second resource reuse pattern based on the determined load;
means for allocating resources to the cell in accordance with the selected resource reuse pattern wherein the first resource reuse pattern has a higher capacity for a communication system than the second resource reuse pattern and the resource pattern allocated to a cell changes from the second resource pattern to the first resource pattern when the load exceeds a threshold;
means for determining resources required to support the capacity requests in the cell;
means for reducing the number of capacity requests if the resources required to support the capacity requests exceeds the resources allocated to the cell; and
means for allocating resources to the capacity requests.

35. An apparatus comprising:
means for allocating resources and a total energy resource in a cell;
means for determining resources required to support capacity requests;
means for determining a total energy required to support the capacity requests;
means for reducing the number of capacity requests if the resources required to support the capacity requests exceed the resources available in the cell or if the total energy required to support the capacity requests exceeds the total energy resource available in the cell; and means for allocating resources to the capacity requests wherein the capacity requests are allocated to resources in an order that is determined based on the energy required to transmit the capacity request, wherein the resources are allocated to the capacity requests in the order of descending power required to transmit each capacity request.

36. An apparatus comprising;
means for determining total capacity requests in a plurality of cells;
means for allocating the capacity requests to orthogonal resources identified by pooling the resources in the plurality of cells, by scheduling each capacity request onto a different resource unit of the pooled resources; and
means for allocating any remaining capacity requests to non orthogonal resources.

37. An apparatus, comprising at least one processor; and at least one memory including computer program code, the at least one memory and the computer program code configured to, with the at least one processor, cause the apparatus to perform at least the following:
to determine total capacity requests in a plurality of cells;
to allocate the capacity requests to orthogonal resources identified by pooling the resources in the plurality of cells, by scheduling each capacity request onto a different resource unit of the pooled resources; and
to allocate any remaining capacity requests to non orthogonal resources.

38. An apparatus as claimed in claim 36 further comprising means for pooling the resources of the plurality of cells in order to identify the orthogonal resources.

39. An apparatus arranged to allocate resources to capacity requests according to the method as described in claim 26 if it is determined by the apparatus that a load in a plurality of cells is balanced.

40. An apparatus arranged to allocate resources to capacity requests according to the method as described in claim 21 if it is determined by the apparatus that a load in a plurality of cells is unbalanced.

41. An apparatus as claimed in claim 36 further comprising means for monitoring a load in the plurality of cells.

42. A non-transitory computer-readable medium tangibly encoded with a computer program executable by a processor to perform actions comprising:
determining a load based on a ratio of occupied to available resources in at least one of cells;
selecting a resource reuse pattern from a set of resource reuse patterns comprising at least a first resource reuse pattern and a second resource reuse pattern based on the determined load, wherein each pattern corresponds to a load class and defines an order in which resources are to be used and the first resource reuse pattern has a higher capacity for a communication system than the second resource reuse pattern; and
allocating resources in accordance with the selected resource reuse pattern wherein capacity requests are scheduled on the resources and the resource pattern allocated to a cell changes from the second resource pattern to the first resource pattern when the load exceeds a threshold.

43. A non-transitory computer-readable medium tangibly encoded with a computer program executable by a processor to perform actions comprising:
allocating resources and a total energy resource in a cell;
determining resources required to support capacity requests;
determining a total energy required to support the capacity requests;
reducing the number of capacity requests if the resources required to support the capacity requests exceed the resources available in the cell or if the total energy required to support the capacity requests exceeds the total energy resource available in the cell; and allocating resources to the capacity requests wherein the capacity requests are allocated to resources in an order that is determined based on the energy required to transmit the capacity request, wherein the resources are allocated to the capacity requests in the order of descending power required to transmit each capacity request.

44. A non-transitory computer-readable medium tangibly encoded with a computer program executable by a processor to perform actions comprising:
determining the total capacity requests in a plurality of cells;
allocating the capacity requests to orthogonal resources identified by pooling the resources in the plurality of cells, by scheduling each capacity request onto a different resource unit of the pooled resources; and
allocating any remaining capacity requests to non orthogonal resources.

45. A non-transitory computer-readable medium tangibly encoded with a computer program executable by a processor to perform actions comprising:
determining a load in the cell;
selecting a resource reuse pattern from a set of resource reuse patterns comprising at least a first resource reuse pattern and a second resource reuse pattern based on the determined load;
allocating resources to the cell in accordance with the selected resource reuse pattern wherein the first resource reuse pattern has a higher capacity for a communication system than the second resource reuse pattern and the resource pattern allocated to a cell changes from the second resource pattern to the first resource pattern when the load exceeds a threshold;
determining resources required to support the capacity requests in a cell;
reducing the number of capacity requests if the resources required to support the capacity requests exceeds the resources allocated to the cell; and
allocating resources to the capacity requests.

46. A non-transitory computer-readable medium tangibly encoded with a computer program executable by a processor to perform actions comprising:
assigning a resource order that defines the order in which resources are to be used, to the cell;
allocating resources to the cell accordance with the assigned resource order wherein a first resource order has a higher capacity for a communication system than a second resource order and the assigned resource order changes from the second resource order to the first resource order when a load of the cell exceeds a threshold;
determining the resources required to support the capacity requests in each cell; and
reducing the number of capacity requests if the resources required to support the capacity requests exceeds the resources allocated to the cell allocating the resources to the capacity requests.

* * * * *